Oct. 18, 1938.     J. B. BROWN     2,133,764
AUXILIARY BRAKE AND CLUTCH CONTROL MEANS FOR
AUTOMOTIVE DELIVERY WAGONS AND TRUCKS
Filed Feb. 12, 1931     4 Sheets-Sheet 1
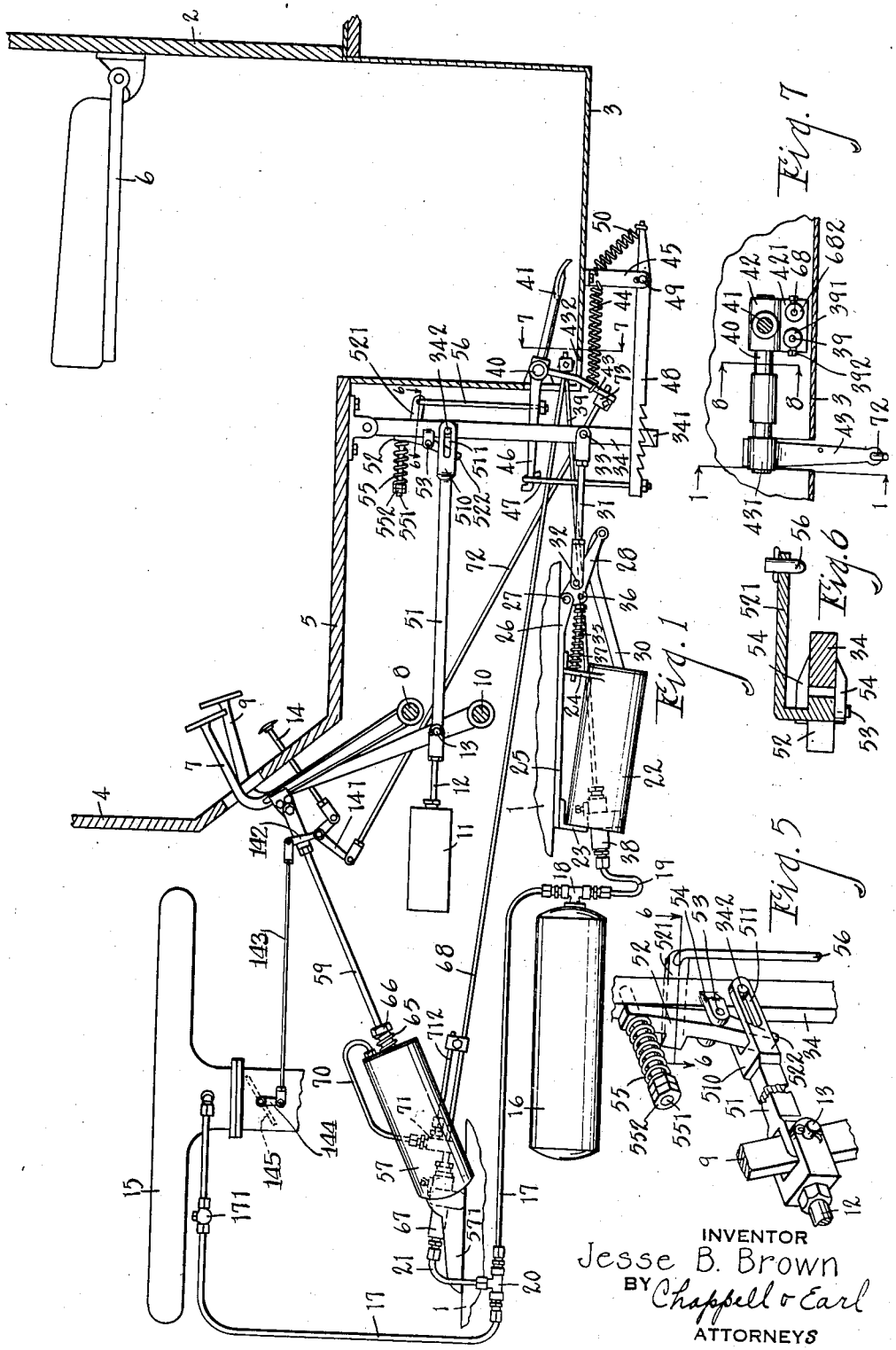
INVENTOR
Jesse B. Brown
BY Chappell & Earl
ATTORNEYS

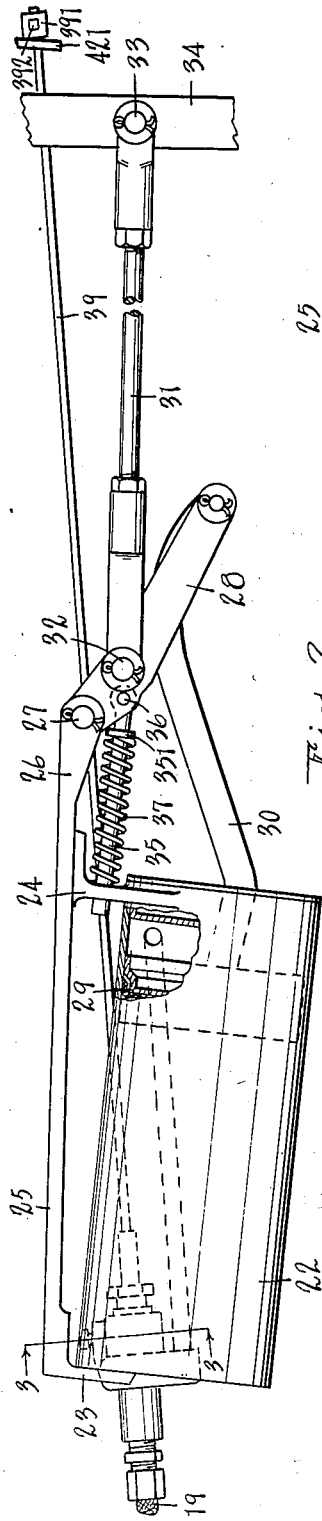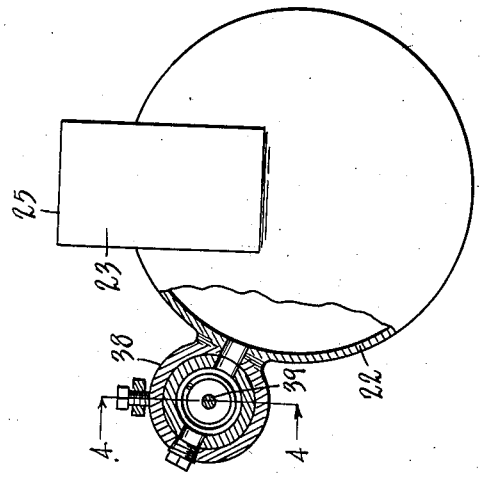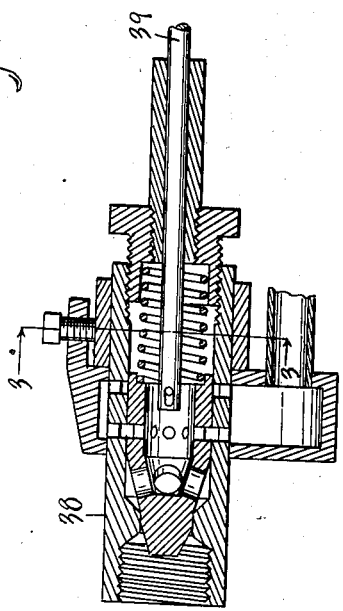

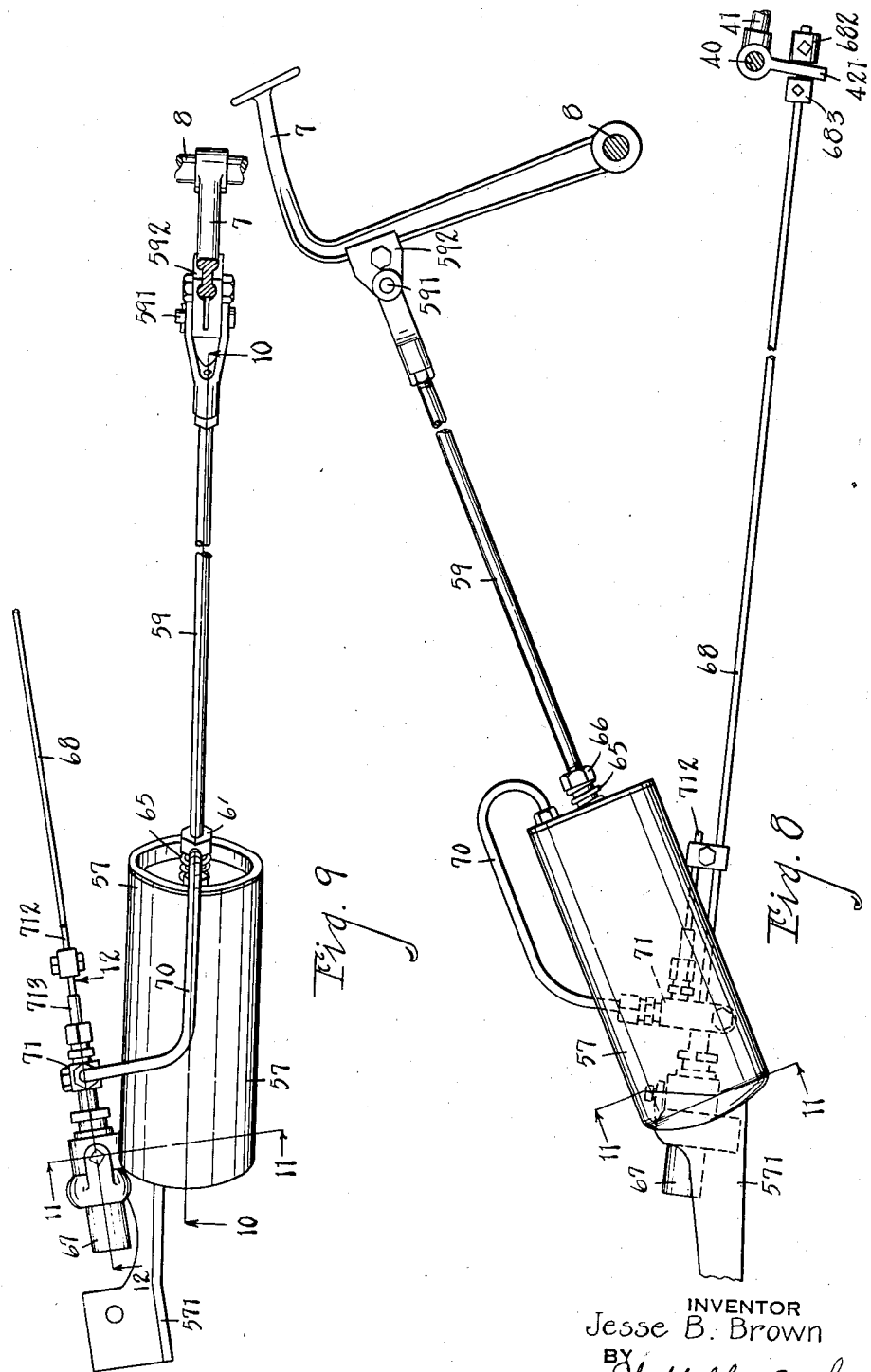

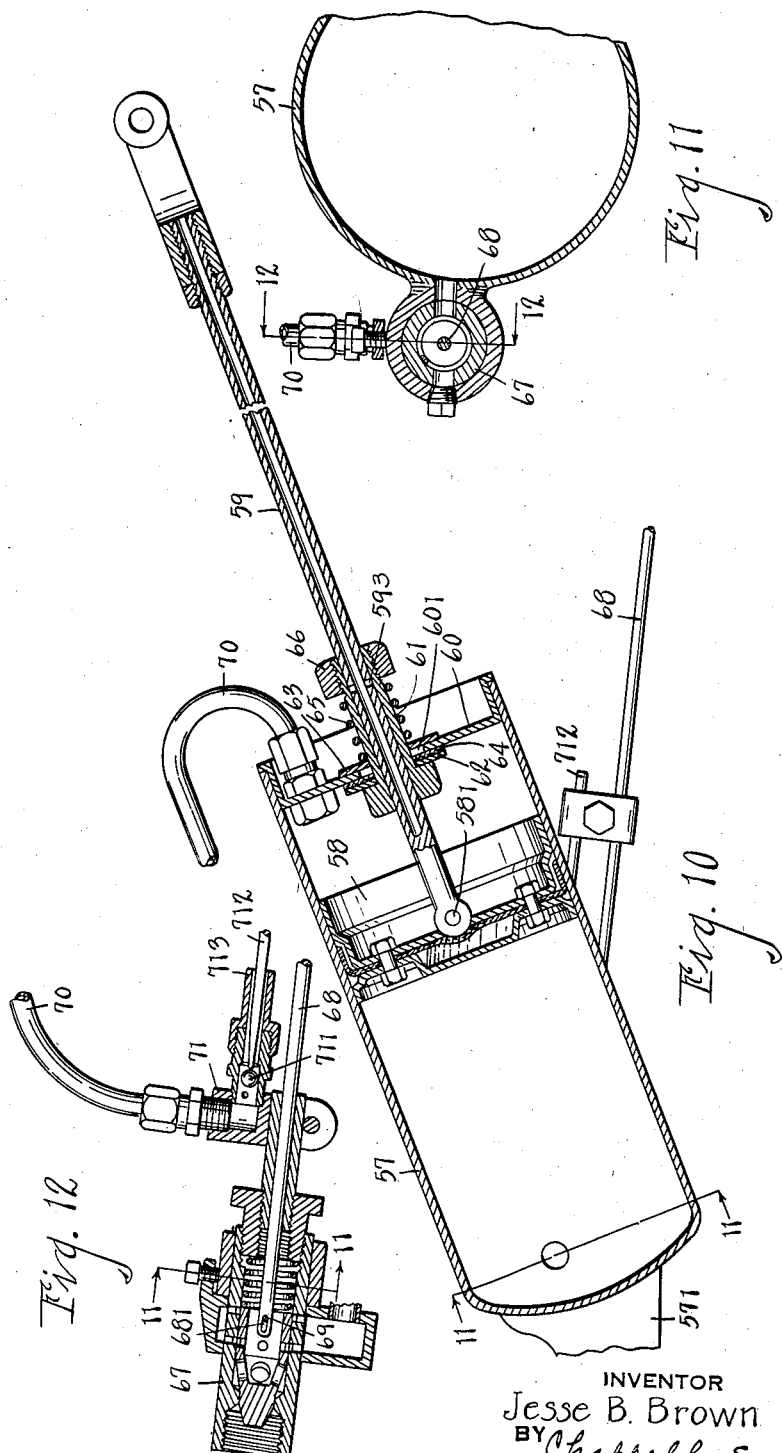

Patented Oct. 18, 1938

2,133,764

UNITED STATES PATENT OFFICE 2,133,764

AUXILIARY BRAKE AND CLUTCH CONTROL MEANS FOR AUTOMOTIVE DELIVERY WAGONS AND TRUCKS

Jesse B. Brown, Detroit, Mich., assignor, by mesne assignments, to Velvet Power Brake Company, Detroit, Mich., a corporation of Michigan Application February 12, 1931, Serial No. 515,177

15 Claims. (Cl. 192—.01)

This invention relates to improved auxiliary brake and clutch control means for automobiles, automotive delivery wagons and trucks.

The objects of the invention are:

First, to provide a simple effective auxiliary control means for delivery wagons particularly adapted to those having a drop body and of application to automobiles generally.

Second, to provide such a structure in which there are proper power units controlled in a semi-automatic manner to accomplish the control of the vehicle and stop the same effectively and also start the same effectively.

Third, to provide in such a structure a related control means for the power units controlled by a single auxiliary control this comprising an operating pedal.

Fourth, to provide in such a structure an improved power controlled brake cylinder mechanism.

Fifth, to provide in such a structure improved means for controlling and regulating the brake to ease its action at the finish.

Sixth, to provide an improved mechanical lock means to hold the brakes set after its power operation.

Seventh, to provide in such a structure an improved power controlled clutch mechanism.

Eighth, to provide in such a clutch control mechanism improved cushion and control to regulate the seating of the clutch.

Ninth, to provide vacuum actuated control means of the class described.

I accomplish the objects of my invention by the means described in the following specification. A preferred embodiment of my invention is illustrated in the accompanying drawings, in which:

Fig. 1 is a detail elevation view with the chassis and parts of a body of a drop frame vehicle with a hinged seat shown diagrammatically and in conventional lines, with the brake released and the clutch engaged.

Fig. 2 is an enlarged detail elevation of the brake cylinder, the actuating brake rod and the intermediate brake lever being shown in broken section and the cylinder being detached from the frame, and a portion of the cylinder being broken away to show details of construction.

Fig. 3 is a still further enlarged detail elevation view from the left hand end of the brake cylinder and support, as seen in Fig. 2, the valve casing and valve being shown in sectional elevation on the oblique section line 3—3, which is in a plane at right angles to the axis of the valve cylinder.

Fig. 4 is a still further enlarged longitudinal vertical detail sectional elevation on line 4—4 of Fig. 3, showing the air connecting housing specifically described in a concurrent application and not a part of the present invention.

Fig. 5 is an enlarged detail perspective view of the intermediate brake lever connection to the hydraulic brake system here conventionally illustrated (which may be any brake system) and the brake rod connection being in broken section, fragments of parts only being shown.

Fig. 6 is a still further enlarged detail sectional view taken on line 6—6 of Figs. 1 and 5.

Fig. 7 is an enlarged detail sectional elevation view on line 7—7 of Fig. 1, showing the pedal rockshaft and its connections to the different power units and to the accelerator.

Fig. 8 is an enlarged detail elevation view of the clutch actuating cylinder and its connection to the clutch pedal (both in broken section) the connection to the valve control being shown in section on line 8—8 of Fig. 7 and the brake connection to the valve control being omitted.

Fig. 9 is a detail plan view on the same scale as Fig. 8 of the clutch cylinder and its connections in broken section, the actuating means for the valve rod being omitted.

Fig. 10 is a still further enlarged detail sectional elevation view of the clutch power cylinder and its piston rod connection, broken in section, taken on line 10—10 of Fig. 9, the cushion control connection being partially broken away.

Fig. 11 is an enlarged detail sectional elevation on the irregular plane indicated by the section lines 11—11 in Figs. 8, 9, 10 and 12.

Fig. 12 is an enlarged detail sectional elevation on line 12—12 of Figs. 9 and 11, showing the control valve structure and the cushion relief control for the clutch power cylinder.

The parts will be identified by their numerals of reference which are the same in all the views.

1 indicates portions of a chassis or frame which supports the entire structure, the same being shown in conventional form. 2 is the body, and 3 is the center drop portion of the body. 4 is the dashboard and 5 is the floor of the cab. 6 is a conventional form of hinged seat carried by the body 2 and adapted to pivot up out of the way of the standing operator and to drop down for him to operate when driving in the normal way. Steering column and other parts are omitted.

7 is the usual clutch pedal operating the clutch rockshaft 8. 9 is the usual form of brake pedal supported on fulcrum 10. 11 is a conventional indication of a hydraulic brake cylinder. 12 is the brake rod, and 13 the pivotal connection of the brake rod to the brake pedal 9. 14 is the accelerator pedal of usual construction. This is connected to lever 142 which is connected by rod 143 to arm 144 and controls the butterfly throttle valve 145. This throttle valve is located in the passage above the carburetor and is a part of the carburetor shell not illustrated in this behalf. The parts thus described are the usual parts found in the regular brake and clutch and accelerator control of a truck or delivery wagon or of an automobile.

My auxiliary mechanism is connected by power means to control through the clutch lever and brake lever the clutch and brake of the vehicle and by an auxiliary timed mechanical connection to regulate the accelerator in proper relation to said clutch and brake units.

The auxiliary structure here shown, with the exception of the accelerator control, is operated by vacuum power means, which is connected to the manifold of the engine. 15 is the engine manifold, 16 is the vacuum tank, and 17 is the main pipe line connection from the manifold to the tank. 18 is a T-connection on the tank with branch connection 19 for actuating the vacuum power brake cylinder. 20 is a T-connection in the main pipe line connection 17 with branch 21 to the vacuum clutch cylinder.

22 is the vacuum power brake cylinder which is connected by brackets 23, 24 to attaching plate 25 by which it is secured to the chassis or frame 1. 26 is a forwardly extending arm on plate 25 carrying fulcrum pin 27. 28 is the lever fulcrumed at 27. The cylinder 22 is provided with a trunk piston 29 which is connected by connecting rod 30 to the lever 28. The connecting rod is of the irregular curved form so that it will travel through the narrow slot in the cylinder head, a feature of a concurrent application.

The lever 28 is provided with intermediate brake connecting rod 31 which is pivotally connected at 32 to the said lever 28 and at 33 to intermediate power lever 34. Lever 28 is provided with an adjunct return spring means comprising plunger rod 35 connected to pivot 36, being provided with a collar 351 and being disposed through an aperture in bracket 24. A spring 37 is interposed between the collar 351 and the bracket 24 to be compressed when power is applied by the cylinder. This is a return spring means. Pivot pin 36 is located in advance of fulcrum 27 and swings around substantially to or near the dead center when the brake is fully operated, so that when the brake is fully applied the spring has no tendency to relieve the brake. The brake pivot 32 is in advance of a line through the pivot centers of the fulcrum 27 and the pivot at the end of the lever, so that when the lever operates to apply the brake the pivot 32 tends to swing to the dead center so far as the fulcrum is concerned and the power is considerably increased. This brake power cylinder is controlled by engine valve 38. The valve, being an engine valve identical with that appearing in my former patent application. Ser. No. 396,616, filed Oct. 2, 1929, needs no detailed description here. Any suitable engine valve is available.

39 is the control rod thereto which passes to the auxiliary control pedal means.

40 is the control pedal rockshaft, 41 is the control pedal, and 42 is the attaching hub for the control pedal. 421 is the downwardly extending rocker plate through which control rod 39 extends. 43 is the timed accelerator control arm attached to rockshaft 40 by hub 431. 44 is the control spring connected to arm 43 and to bracket 45 on the underside of the drop floor 3 of the vehicle. A stop 432 is provided by a suitable notch in the floor 3 for the lever 43 which is also limited by the movements of the valves and other parts which are controlled by the rockshaft 40 so that the stop might be dispensed with. A stop collar 391 is provided on the end of the rod 39 for cooperation with the rocking plate 421, the collar 391 being adjustably secured by set screw 392. It will thus be seen that the spring 44 acts to throw the pedal 41 into the up position.

When the pedal is depressed as indicated in Fig. 1, the vacuum is shut off from the cylinder 22 which, owing to the various return spring actions of the various parts, throws the brake to the released position through the various connections. When the pedal is released the vacuum is open, the piston 29 is withdrawn and the brake through its connections is at once applied.

A lock means is provided for the brake which comprises an arm 46 on the control pedal rockshaft 40 which is provided with a loose link connection 47 to a ratchet bar 48 which is pivoted at 49 on the bracket 45 and urged downwardly by the spring 50 connected to the projecting end thereof. The ratchet teeth on the bar 48 are provided with vertical engaging portions of considerable height. The lower end of intermediate brake lever 34 is provided with a ratchet pawl tooth 341 which cooperates with the said rack teeth and permits considerable oscillation of lever 46 thereof without its release. Lost motion is provided in the connection by the arm 46 and the link 47 which likewise permits this movement of the pedal without operating the lock.

Intermediate brake lever 34 is connected by pitman 51 to the brake pivot pin 13, the end being bifurcated therefor. The forward end of pitman 51 is bifurcated at 510 which bifurcations are provided with elongated guide slots 511 which slidably engage pivot pin 342 on the said intermediate lever 34. A control means is provided for checking the action of the brake cylinder to insure the gradual seating of the brake.

52 is an auxiliary bent control lever fulcrumed at 53 on brackets 54 on the auxiliary lever 34. This lever is held yieldingly in position by compression spring 55 on bolt 551 carried by the intermediate brake lever 34. This is embraced at its inner end by an extension of the lever 52 and is provided with stop nuts 552. 521 is a projecting arm on the said lever 52 which is provided with connecting link 56 to the arm 46 on the rockshaft 40. The lower arm 522 of the lever 52 extends between the bifurcations 510 and is adapted to engage the end of the pitman 51.

A consideration of these brake elements will make clear the operation of the structure and the purpose of the various parts. When the pedal is depressed by the driver to the position indicated in Fig. 1, the brake is released and the clutch is engaged. When the driver takes his foot from the pedal, the spring 44 throws the pedal forcibly upward and rocks the rockshaft 40 at the same time. This, so far as the brake is concerned, forcibly withdraws the valve rod 39, thereby opening the valve 38 and permitting the vacuum to draw the piston inwardly. This operates lever 28 through the connections thereto and by the intermediate brake connecting rod 31 operates intermediate brake lever 34. On swinging the lever 34 towards the left, as seen in the illustration in Fig. 1, this reacts upon the brake pitman 51 by the yielding contact of the projecting arm 522 of the intermediate lever 52, thereby acting upon the hydraulic brake system indicated diagrammatically at 11. When the resistance of the brake exceeds the force of the yielding means, the arm 522 of the lever is depressed and this operates the rock lever 52 and through the arm 521 raises arm 46, thereby rocking the rockshaft 40 slightly and permitting the engine valve of the cylinder to close partially and check the action of the vacuum. This is permissible without disengaging the lock, due either to the broad engaging teeth of the rack or to the lost motion in the connection between the arm 46 and the link 47. Thus the brake is held locked and at the same time is gradually seated by the reduced action of the vacuum, which is the proper movement for the manipulation of the brake for the highest efficiency.

It is clear that the resistance on lever 34 might be very greatly modified and variously introduced to accomplish this result of controlling the valve at the finish of the braking operation.

The clutch pedal is controlled by the vacuum cylinder 57 which is provided with a trunk piston 58. This is provided with the hollow connecting rod 59 which is pivoted at 581 to the piston 58 and pivotally connected at 591 to clamp bracket 592 secured to the pedal 7.

A cylinder head 60 is provided for the cylinder 57 and a sleeve 61 through which the connecting rod 59 slides is disposed through an enlarged aperture 601 in the head 60. This sleeve is retained in place by the broad washers 62, 63, washer 62 embracing a leather washer 64. The washers are clamped by a spring 65 which is held by the adjustable stop nut 66. The cylinder 57 is supported by bracket 571 which is secured to the frame 1 as seen in Fig. 1. The cylinder is controlled by engine valve 67 which may be any suitable engine valve, this valve being in all particulars like the engine valve appearing in my application Ser. No. 396,616, filed Oct. 2, 1929, which has eventuated in Patent No. 1,950,474, dated Mar. 13, 1934, so that a detailed description is not necessary here. The same is controlled by rod 68 which is slotted at 681 at its inner end and engages cross pin 69 in the valve structure 67 which permits a slight lost motion so that the control of a check valve and the regulation of the cushion of the cylinder is possible. Stop collars 682 and 683 are provided on the rod 68 for cooperation with the rocker plate 421.

As to the cushioning device, I will explain: It will be seen that the hollow piston rod 59 is provided with a cross bore 593 at a considerable distance from its inner pivoted end. It will be observed that when this cross bore passes within the sleeve 61, the air in the end of the cylinder will be confined and form a cushion. This chamber is provided with an outlet relief pipe 70 which connects to a check valve casing 71 which has a lateral outlet 713 and a laterally seating ball check 711. Clamped to the actuating rod 68 is an auxiliary actuating rod 712 which projects through the narrow tubular outlet 713 of the valve and after the partial seating of the clutch opens the valve and vents the cushion, and permits the clutch to seat promptly with full force, thereby checking the movement of the clutch pedal for a brief period before the final engagement of the clutch.

It will thus be seen that the operation of the clutch is effectively controlled, its movement is slowed up at the proper time to prevent sudden action, and the clutch is effectively seated in a correct manner. Owing to the action of the cushion the same is delayed until the brake has been fully released and there is consequently no undue strain or loss of power, the entire operation being very smooth and effective. This is all accomplished while the engine is running in partially throttled condition. The release of the clutch is free.

As soon as this clutching is accomplished, it is very clear that it is desirable that the engine be accelerated. Provision is made for this by the arm 43 which might be termed the accelerator arm. A bell crank 141 is provided for the accelerator 14 and to this is connected push rod 72. This is provided with an adjustable collar 73 in front of the arm 43 which is so spaced and adjusted that the thrust rod 72 is not acted upon until after the brake has been released and the clutch engaged, at which time the throttled engine is accelerated at just the right time to secure the best results. The speed of the engine is determined by the adjustment of the collar 73 which regulates the throttle to the desired point.

Thus it will be seen that the depression of the single lever 41 first completely releases the brake and controls the clutch in retarded relation thereto in a proper and effective manner, and then accelerates the throttled engine to the desired or required speed. When the pedal 41 is released, the reverse action takes place. The engine is at once throttled, the clutch promptly and fully released, because the cushion does not act on the reverse, and the brake is then applied in a proper and efficient manner to effectively and softly stop the car.

The mechanism I have shown is in each instance a vacuum operated mechanism which is especially desirable and convenient for the purpose presented. The same principle broadly considered would be applied if pressure means or even electric means were made use of for the application of the brake.

I desire to claim my invention in the specific form illustrated, which is very effective and which I believe to be very meritorious, and I also wish to claim the invention broadly as pointed out in the appended claims.

Having thus described my invention, what I claim as new and desire to secure by Letters Patent is:

1. In an auxiliary brake and clutch control means for automotive delivery vehicles, the combination with the engine, the clutch, brake and accelerator means and pedals, of an auxiliary vacuum brake cylinder having piston connections and lever control means and having an engine valve and connections to a vacuum means, actuating levers cooperating with said piston connections in said cylinder, an intermediate brake lever, a pitman connection therefrom having a slotted yoke guided on a cross pin on said intermediate lever, a yielding means carried by said lever, an auxiliary actuating pedal, a rockshaft therefor, an arm connected to said yielding means, an actuating rock plate having connections for controlling the valve to said engine, a spring means for actuating the said shaft to return it to initial position and actuate the said rocker plate, a pivoted ratchet rack bar cooperating with a ratchet tooth on said auxiliary lever for locking the same, lost motion connections to the said lever to permit the yielding operating means to operate the pedal rockshaft to partially actuate the valve means and check the action of the brake cylinder, an auxiliary cylinder having a piston connection to the clutch pedal lever, an engine valve therefor having actuating rod connections to the said rocker plate on the auxiliary pedal shaft for operating the same, means for confining air in the head of said cylinder to form an air cushion, a relief passage leading therefrom controlled by a check valve, an auxiliary connection to the engine valve control rod for tripping the said valve to release the cushion to permit the clutch to engage, a connecting means to the accelerator comprising a push rod, and an adjustable collar thereon for adjusting the contact to control the accelerator and increase its action after the release of the brakes and the seating of the clutch.

2. In an auxiliary brake and clutch control means for automotive delivery vehicles, the combination with the engine, the clutch, brake and accelerator means and pedals, of an auxiliary vacuum brake cylinder having piston connections and lever control means and having an engine valve and connections to a vacuum means, actuating levers cooperating with said piston connections in said cylinder, an intermediate brake lever, a pitman connection therefrom having a slotted yoke guided on a cross pin on said intermediate lever, a yielding means carried by said lever, an auxiliary actuating pedal, a rockshaft therefor, an arm connected to said yielding means, an actuating rock plate having connections for controlling the valve to said engine, a spring means for actuating the said shaft to return it to initial position and actuate the said rocker plate, a pivoted rachet rack bar cooperating with a ratchet tooth on said auxiliary lever for locking the same, lost motion connections to the said lever to permit the yielding operating means to operate the pedal rockshaft to partially actuate the valve means and check the action of the brake cylinder, power control means for the clutch pedal having connections for retarded operation to engage the clutch after the release of the brakes, and a connecting means to the accelerator comprising a push rod, and an adjustable collar thereon for adjusting the contact to control the accelerator and increase its action after the release of the brakes and the seating of the clutch.

3. In an auxiliary brake and clutch control means for automotive delivery vehicles, the combination with the clutch, brake and accelerator means and pedals, of an auxiliary vacuum brake cylinder having piston connections and lever control means and having an engine valve and connections to a vacuum means, an auxiliary cylinder having a piston connection to the clutch pedal lever, an engine valve therefor, an auxiliary actuating pedal for operating said engine valve, means for confining air in the head of said cylinder to form an air cushion, a relief passage leading therefrom controlled by a check valve, an auxiliary connection to the engine valve control rod for tripping the said valve to release the cushion to permit the clutch to engage, a connecting means to the accelerator comprising a push rod, and an adjustable collar thereon for adjusting the contact to control the accelerator and increase its action after the release of the brakes and the seating of the clutch.

4. In an auxiliary brake and clutch control means for automotive delivery vehicles, the combination with the engine, the clutch, brake and accelerator means and pedals, of an auxiliary vacuum brake cylinder having piston connections and lever control means and having connections to a vacuum means, actuating levers cooperating with said piston connections in said cylinder, an intermediate brake lever, a pitman connection therefrom having a slotted yoke guided on a cross pin on said intermediate lever, a yielding means carried by said lever, an auxiliary actuating pedal, a rockshaft therefor, an arm connected to said yielding means, an actuating rocker plate having connections for controlling the valve to said engine, a spring means for actuating the said shaft to return it to initial position and actuate the said rocker plate, a pivoted ratchet rack bar cooperating with a ratchet tooth on said auxiliary lever for locking the same, lost motion connections to the said lever to permit the yielding operating means to operate the pedal rockshaft to partially actuate the valve means and check the action of the brake cylinder, an auxiliary cylinder having a piston connection to the clutch pedal lever, an engine valve therefor having actuating rod connections to the said rocker plate on the auxiliary pedal shaft for operating the same, means for confining air in the head of said cylinder to form an air cushion, a relief passage leading therefrom controlled by a check valve, and an auxiliary connection to the engine valve control rod for tripping the said valve to release the cushion to permit the clutch to engage.

5. In an auxiliary brake and clutch control means for automotive delivery vehicles, the combination with the engine, the clutch, brake and accelerator means and pedals, of an auxiliary vacuum brake cylinder having piston connections and lever control means and having connections to a vacuum means, actuating levers cooperating with said piston connections in said cylinder, an intermediate brake lever, a pitman connection therefrom having a slotted yoke guided on a cross pin on said intermediate lever, a yielding means carried by said lever, an auxiliary actuating pedal, a rockshaft therefor, an arm connected to said yielding means, an actuating rocker plate having connections for controlling the valve to said engine, a spring means for actuating the said shaft to return it to initial position and actuate the said rocker plate, a pivoted ratchet rack bar cooperating with a ratchet tooth on said auxiliary lever for locking the same, lost motion connections to the said lever to permit the yielding operating means to operate the pedal rockshaft to partially actuate the valve means and check the action of the brake cylinder, and power control means for the clutch pedal having connections for retarded operation to engage the clutch after the release of the brakes.

6. In an auxiliary brake and clutch control means for automotive delivery vehicles, the combination with the clutch, brake and accelerator means and pedals, of an auxiliary vacuum brake cylinder having piston connections and lever control means and having connections to a vacuum means, an auxiliary cylinder having a piston connection to the clutch pedal lever, an engine valve therefor, an auxiliary actuating pedal for operating said engine valve, means for confining air in the head of said cylinder to form an air cushion, a relief passage leading therefrom controlled by a check valve, and an auxiliary connection to the engine valve control rod for tripping the said valve to release the cushion to permit the clutch to engage.

7. In an auxiliary brake and clutch control means for automotive delivery vehicles, the combination with the clutch, brake and accelerator means and pedals, of an auxiliary vacuum brake cylinder having piston connections and lever control means and having connections to a vacuum means, an auxiliary vacuum cylinder having piston connections to the clutch pedal, engine valves for controlling the same, an auxiliary pedal, engine valves for the said cylinder connections for the auxiliary pedal to operate said engine valves, whereby the clutch will be released and the brake applied gradually and effectively, or, vice versa, the brake will be released and the clutch applied gradually and effectively, due to the depressed or raised position of the said auxiliary pedal, and auxiliary connections to the accelerator timed to operate to accelerate after the engagement of the clutch and to cut off immediately when braking to stop the vehicle.

8. In an auxiliary brake and clutch control means for automotive delivery vehicles, the combination with the clutch, brake and accelerator means and pedals, of an auxiliary vacuum brake cylinder having piston connections and lever control means and having connections to a vacuum means, an auxiliary vacuum cylinder having piston connections to the clutch pedal, engine valves for controlling the same, an auxiliary pedal, engine valves for the said cylinder, connections for the auxiliary pedal to operate said engine valves, and auxiliary connections to the accelerator timed to operate to accelerate after the engagement of the clutch and to cut off immediately when braking to stop the vehicle.

9. In an auxiliary brake and clutch control means for automotive delivery vehicles, the combination with the clutch, brake and accelerator means and pedals, of an auxiliary vacuum brake cylinder having piston connections and lever control means and having connections to a vacuum means, an auxiliary vacuum cylinder having piston connections to the clutch pedal, engine valves for controlling the same, an auxiliary pedal, and engine valves for the said cylinder, connections for the auxiliary pedal to operate said engine valves, whereby the clutch will be released and the brake applied gradually and effectively, or vice versa, the brake will be released and the clutch applied gradually and effectively, due to the depressed or raised position of the said auxiliary pedal.

10. In an auxiliary brake and clutch control means for automotive delivery vehicles, the combination with the clutch, brake and accelerator means and pedals, of an auxiliary vacuum brake cylinder having piston connections and lever control means and having connections to a vacuum means, an auxiliary vacuum cylinder having piston connections to the clutch pedal, engine valves for controlling the same, an auxiliary pedal, and engine valves for the said cylinder connections for the auxiliary pedal to operate said engine valves.

11. In a vacuum power brake means for automobile structures, the combination of a vacuum cylinder having a piston, lever connections therein, an engine valve for controlling the portage to said piston adapted to adjust to regulate the size of the passage, an intermediate brake lever, a yielding means carried by the said intermediate brake lever having a movable member connected therewith adapted to contact for actuating the brake unit, and a connection from the movable member to the engine valve, whereby on the actuation of the brake when the resistance of the brake overcomes the resistance of the yielding member, the engine valve will be actuated to cut down the portage to the engine and ease the action of the brake in its final movement.

12. In a brake structure, the combination of an engine cylinder and piston, an engine valve for controlling the same, connections from the piston to operate the brake, a yielding means in the connection having a movable member, and connections from the movable member to the engine valve, whereby when the resistance of the brake overcomes the resistance of the yielding member the engine valve will be acted upon to close the portage and ease the action of the engine cylinder in the final movement of the brake.

13. In a clutch mechanism, the combination with the clutch lever, of a cylinder having a piston, a piston rod connected to actuate the said clutch lever, means for confining air in the end of the cylinder to cushion the piston and check the movement of the clutch lever, vent means for the said cushion chamber, an engine valve having a control rod for manipulating the same, an auxiliary check valve for controlling the said cushion, an auxiliary trip for releasing the check valve at the end of the cushioning to release the cushion and permit the clutch to finally engage.

14. The combination of a cylinder having a suitable support, a supporting plate having a projecting arm, a trunk piston therein, a pitman pivoted to said piston, a simple lever, a fulcrum for the end of said lever at the end of the supporting arm, a pivotal connection intermediate the ends of said lever to the brake equalizer, the said brake pivotal connection being in advance of a line through the said fulcrum and pitman connection, whereby when the piston acts on said lever the brake pivot swings toward the dead center and the power of the lever is increased as it is acted on by the piston.

15. The combination of a cylinder having a suitable support, a supporting plate having a projecting arm, a trunk piston therein, a pitman pivoted to said piston, a simple lever, a fulcrum for the end of said lever at the end of the supporting arm, a pivotal connection intermediate the ends of said lever to the brake equalizer, the said brake pivotal connection being in advance of a line through the said fulcrum and pitman connection, whereby when the piston acts on said lever the brake pivot swings toward the dead center and the power of the lever is increased as it is acted on by the piston, a return spring abutting against the cylinder support, and a shouldered rod carrying the said spring pivoted in proximity to the brake pivot whereby it swings toward the dead center to minimize the action of the spring when the brake is applied.

JESSE B. BROWN.